United States Patent [19]

Niccols

[11] 4,185,359
[45] Jan. 29, 1980

[54] POULTRY CLEANING METHOD

[75] Inventor: Paul L. Niccols, Springfield, Mo.

[73] Assignee: Harris Hatchery, Bentonville, Ark.; a part interest

[21] Appl. No.: 913,736

[22] Filed: Jun. 6, 1978

Related U.S. Application Data

[62] Division of Ser. No. 803,412, Jun. 3, 1977, Pat. No. 4,106,161.

[51] Int. Cl.$^2$ .............................................. A22C 21/06
[52] U.S. Cl. .......................................... 17/51; 17/11; 134/181
[58] Field of Search ............... 17/51, 11; 134/24, 153, 134/157, 167 R, 180, 181

[56] References Cited

U.S. PATENT DOCUMENTS

| | | | |
|---|---|---|---|
| 1,730,658 | 10/1929 | Jensen | 134/181 X |
| 2,563,130 | 8/1951 | Mylchreest | 134/167 R X |
| 2,723,421 | 11/1955 | Smith et al. | 17/11 |
| 3,236,249 | 2/1966 | Everroad | 134/167 R |

Primary Examiner—Z. R. Bilinsky
Attorney, Agent, or Firm—Mason, Fenwick & Lawrence

[57] ABSTRACT

An apparatus and method for removing contamination from the body cavity of poultry includes means providing a source of pressurized water to a rotary vertical pipe having central nozzle means mounted on its upper end and to fixed side nozzles positioned adjacent opposite sides of the central nozzle with a fowl supporting and positioning rack means being positioned over the nozzles; the abdominal cavity of a fowl is positioned over the supporting and positioning rack means which is oscillated while water is ejected from the nozzles with sufficient force to remove the kidneys and contamination from the body cavity. In a second embodiment the side nozzles oscillate about the axis of the rotary vertical pipe and the supporting and positioning rack is stationary.

11 Claims, 9 Drawing Figures

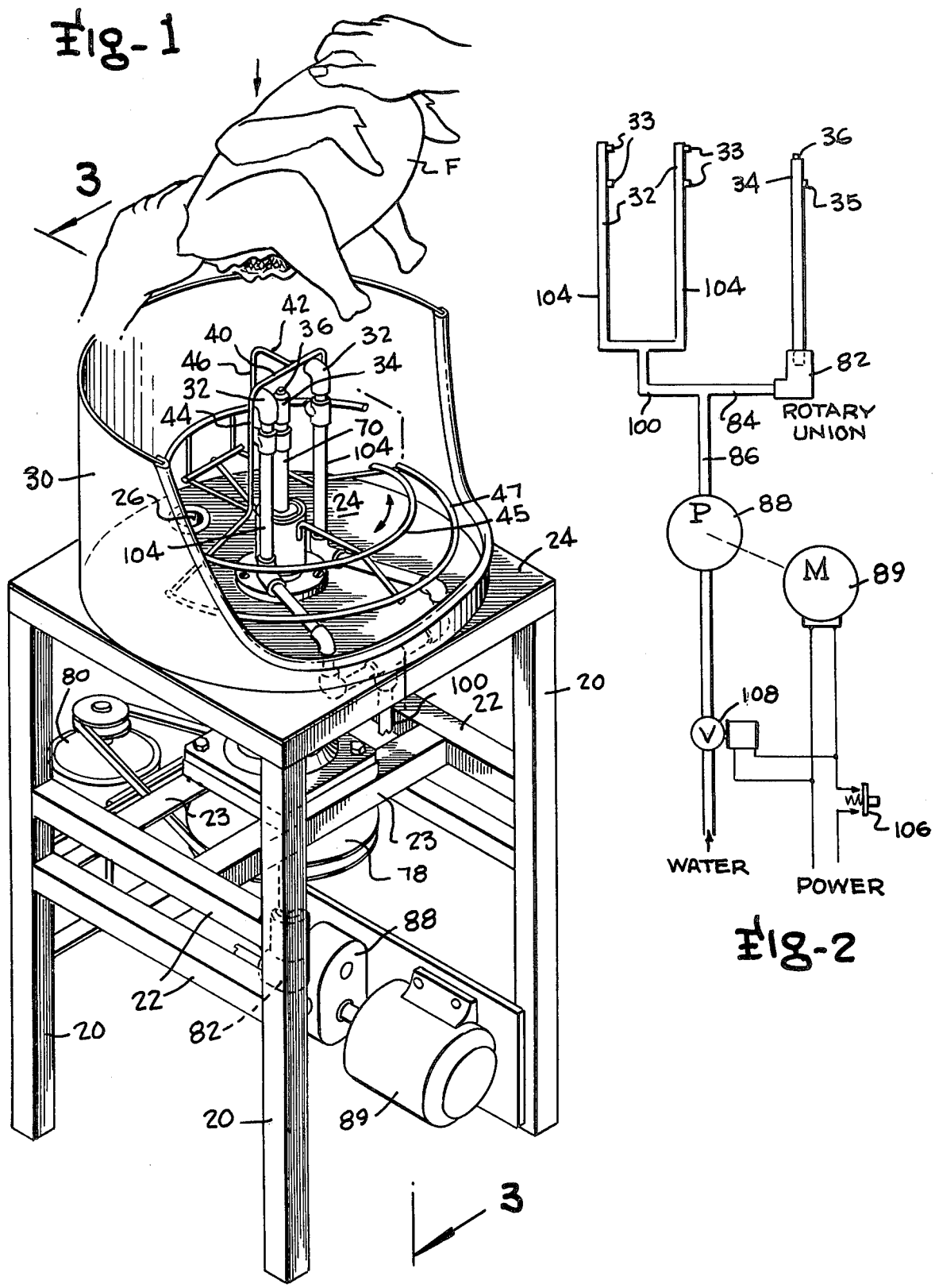

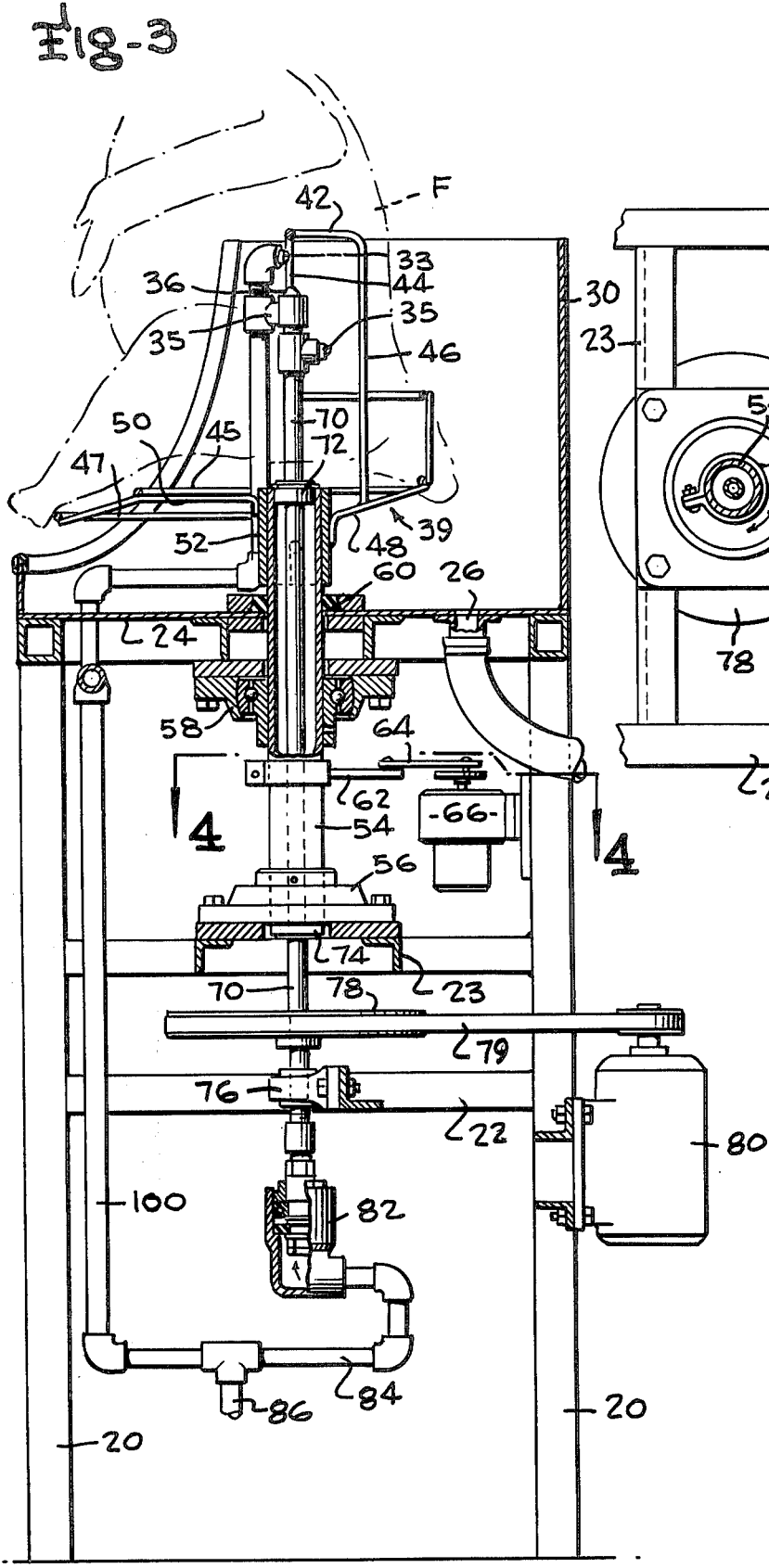
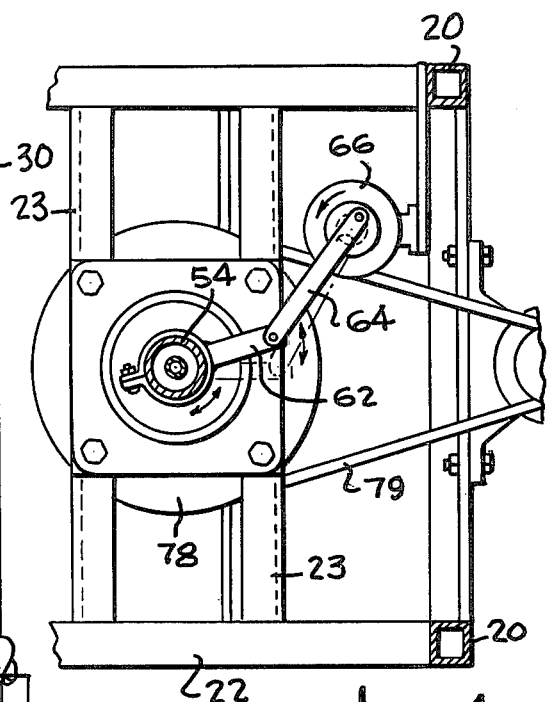
Fig-3
Fig-4

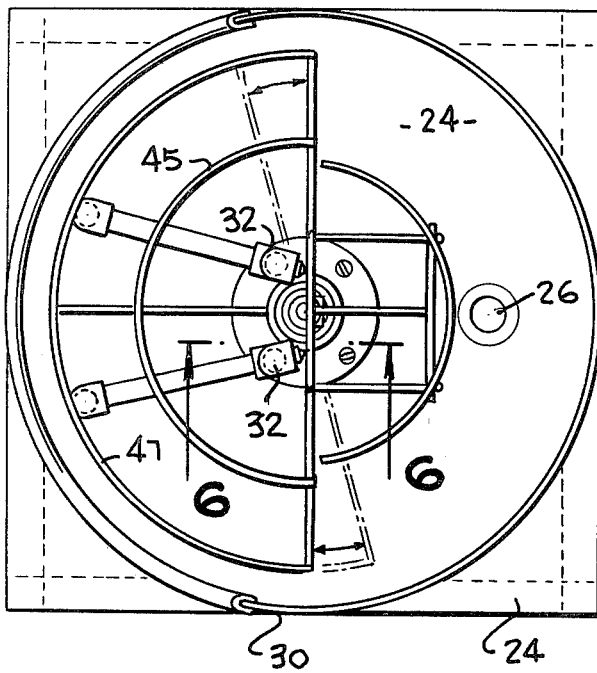
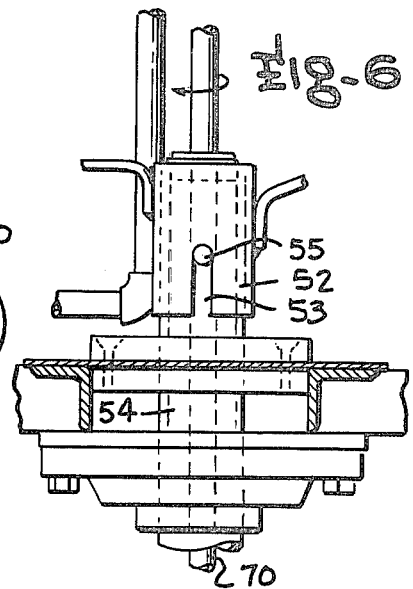
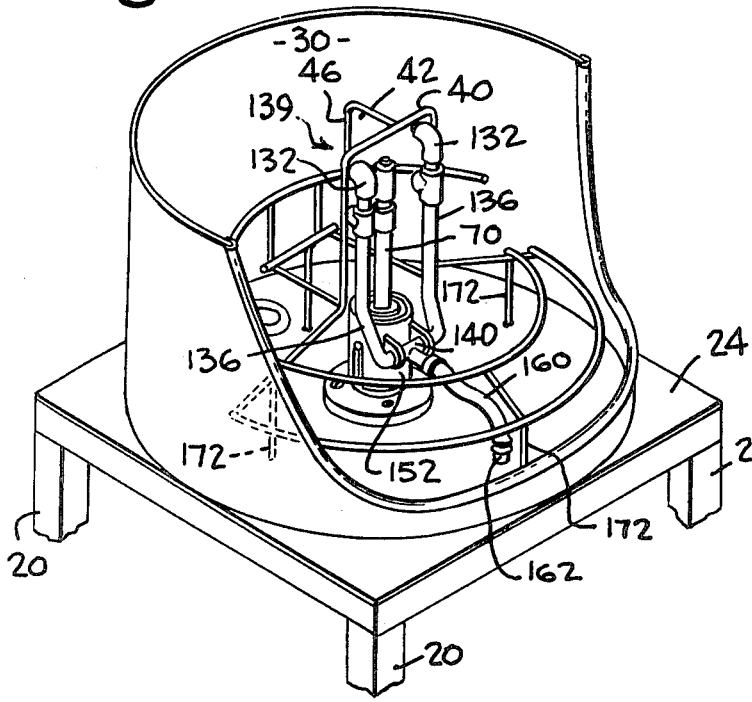
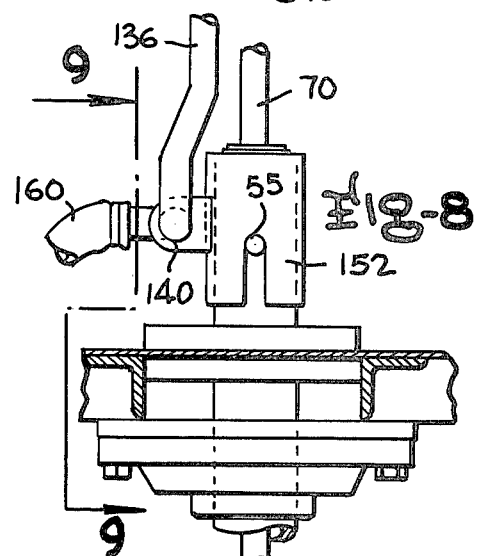
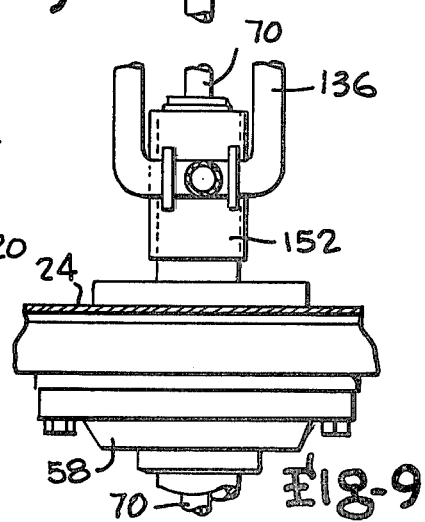

POULTRY CLEANING METHOD

This is a division, of application Ser. No. 803,412 filed June 3, 1977, which issued on Aug. 15, 1978 as U.S. Pat. No. 4,106,161.

This invention is in the field of poultry processing apparatus and methods and is more specifically directed to a unique apparatus and method for effecting the removal of ingesta or feces contamination from the abdominal cavity of all types of poultry.

The United States Department of Agriculture has issued regulations for poultry processing plants for the purpose of ensuring the public health and welfare with these regulations being enforced by federal inspection on a regular basis. One substantial problem in the processing of poultry arises from the fact that the digestive tract organs are sometimes cut or otherwise opened during the eviscerating process so that the ingesta or feces contents are released in the abdominal cavity of the bird to completely contaminate the interior of the cavity. Prior to the present invention, there was no satisfactory way for removing the contamination after such an accident; consequently, any contaminated bird or parts thereof are immediately condemned for human consumption and is then normally converted into pet food or the like at a substantial loss.

While various devices have been proposed in the past for the purpose of cleaning the abdominal cavity following contamination resultant from rupture of the abdominal organs, none of the prior known devices has proven to be satisfactory and the Department of Agriculture has consequently properly refused to approve the usage of such devices on fowl destined for human consumption. One of the problems with the prior known devices proposed for cleaning the abdominal cavity is that they have not been effective for the purpose of removing the kidneys. Such removal of the kidneys is essential if all contamination is to be removed from the fowl and any device for cleaning fowl following contamination from an intestinal rupture or the like during the eviscerating process must remove the kidneys. However, the kidneys are difficult to remove and a direct stream of water is ineffective for this purpose. This difficulty is due to the fact that there is a membrane over each kidney which keeps it in place adjacent the spinal area of the bird. One aspect of the present invention resides in the fact that by providing for relative oscillation between the bird and washer or spray heads having high pressure water discharge nozzles positioned in the body cavity, sufficient agitation is provided to remove the membrane over the kidneys and the kidneys are consequently completely washed from the cavity along with any associated contamination.

Therefore, the primary object of this invention is the provision of a new and improved apparatus and method for removing contamination from the body cavity of fowl.

Yet another object of the invention is the provision of a new and improved fowl cleaning apparatus and method capable of removing the kidneys and associated membrane from the body cavity of fowl.

A still further object of the invention is the provision of a new and improved apparatus and method for removing all contamination from the body cavity of fowl resulting from severing of the intestinal tract or other organs during the eviscerating process.

Achievement of the foregoing objects is enabled by the provision of water discharging nozzle means within the confines of a fowl positioning and supporting rack onto which a fowl is positioned in a tail-down position with the rack extending upwardly into the body cavity. The nozzle means includes both movable and fixed nozzles positioned close to the surface of the body cavity of the fowl on the positioning and supporting rack. High pressure water is provided by a pump to be discharged by the nozzles into the cavity in an effective manner for removing all contamination and the kidneys in a simple and effective manner.

A better understanding of the manner in which the preferred embodiments of the invention achieve the foregoing objects of the invention will be enabled when the following written description is considered in conjunction with the appended drawings in which:

FIG. 1 is a perspective view of a first embodiment of the invention;

FIG. 2 is a flow and power supply diagram of the first embodiment;

FIG. 3 is a sectional view taken along lines 3—3 of FIG. 1;

FIG. 4 is a sectional view taken along lines 4—4 of FIG. 3;

FIG. 5 is a top plan view of the embodiment of FIG. 1;

FIG. 6 is a sectional view taken along lines 6—6 of FIG. 5;

FIG. 7 is a perspective view of a second embodiment of the invention;

FIG. 8 is a side elevation view of nozzle supporting means similar to FIG. 6; and FIG. 9 is a sectional view taken along lines 9—9 of FIG. 8.

Attention is initially invited to FIG. 1 which illustrates a first embodiment of the invention provided for the removal of contamination from the body cavity of fowl F and which includes a supporting framework or stand including a plurality of vertical legs 20 and horizontal frame components 22, 23 supporting a shield means including table-like panel 24 formed of stainless steel in which a drain 26 is provided. A semi-cylindrical spray shield 30 also formed of stainless steel or aluminum is unitarily joined to the table-like panel 24 and encloses the means for cleaning the contaminated fowl F.

More specifically, the fowl cleaning means includes first and second fixedly positioned spray heads 32 each having two fixed water jet discharging nozzles 33 for discharging a horizontal jet of water from a pressurized source to be described hereinafter. Additionally, a movable spray head 34 having a horizontal discharge nozzle 35 and a vertical discharge nozzle 36 is provided between the fixed spray head 32 with the movable spray head 34 being mounted for rotation about a vertical axis in a manner to be described.

A rigid and unitary fowl positioning and supporting rack 39 formed of stainless steel rod members is positioned in a surrounding manner outwardly of and adjacent the fixed and movable nozzle means 32, 34 and includes an upper horizontal traversing rod portion 40 extending above the nozzles 32, 34 and an upper horizontal spacer rod component 42 welded on one end to rod portion 40 while a similar vertical component 46 extends downwardly from component 42. The lower portion of the fowl positioning and support rack 39 includes arcuate sectors 45, 47 and linear elements 48 and 50 welded to a base sleeve 52. Base sleeve 52 is removably mounted on the upper end of a vertically oriented support sleeve 54 carried by rotary bearing means 56 and 58 mounted on the frame of the stand member. Support sleeve 54 can be easily rotated and a seal 60 engages the outer surface of the support sleeve 54 above the table-like panel 24 as shown in FIG. 3. A crank arm 62 extends radially from the support sleeve 54 and is connected to a floating drive link 64 which is eccentrically connected to the output shaft of a small oscillation drive motor 66 as shown in FIG. 3. Operation of motor 66 serves to oscillate link 62 and support sleeve 54 through an angle of approximately 15° in an obvious manner as illustrated by the arrow in FIG. 4. Consequently, the base sleeve 52, which has a slot 53 fitted over a radial drive pin 55 extending from sleeve 54, and the fowl positioning and supporting rack 39 are also oscillated through an angle of approximately 15° by operation of the motor 66.

A vertical nozzle supporting rotating standpipe 70 supports the movable nozzle 34 on its upper end and extends axially through the support sleeve 54 through a rotary bearing 72 on the upper end of the sleeve 54 and a similar rotary bearing 74 on the lower end of sleeve 54. Additionally, a rotary bearing 76 mounted on the support frame engages and supports the lower end of vertical pipe 70. A pulley 78 is fixedly connected to the lower end of vertical pipe 70 and is driven by a belt 79 extending from a motor 80 as best illustrated in FIG. 3. Operation of motor 80 serves to rotate pipe 70 and nozzle 34 in an obvious manner. The lower end of pipe 70 is connected by a conventional rotary coupling 82 to a supply pipe 84 which receives pressurized water from the output pipe 86 of a pump 88 driven by pump motor means 90. A fixed vertical pipe 100 is also connected to the output pipe 86 to supply pressurized water to two vertical support pipes 104 to the upper ends of which spray heads 32 are connected.

Operation of a main power switch 106 to complete a circuit to a source of power results in operation of motor 89 for driving the pump 88 and also serves to operate a solenoid valve 108 to supply pressurized water at approximately 120 psi to the spray heads 32, 34 and their associated nozzle members in a manner that will be apparent from inspection of FIG. 2. Additionally, the switch 106 can also be employed for activating the supporting rack oscillation motor 66 and the rotary nozzle drive motor 80 if desired.

In any event, motors 66 and 80 are activated when it is desired to remove contamination from a fowl F after the fowl is positioned over the support means 40, 42, 44, 46 etc. of rack 39 which extends upwardly into the body cavity of the fowl. The vertical orientation of the fowl illustrated in FIG. 3 is of great importance in that it permits drainage of the wash water and entrained contaminants upon operation of the nozzles. Rotation of the movable nozzle head 34 while discharging water spray from the fixed spray heads 32 in conjunction with the relative movement between the spray heads and the bird caused by oscillation of rack 39 serves to provide for a full cleansing of the body cavity of the fowl. Discharge of water and associated contamination from the bird flows outwardly through the drain 26. The fowl is cleansed in the position shown in FIG. 3 for approximately 15 seconds and the effective action of the combination of the rotary and fixed spray heads and the movable bird support which closely positions the bird adjacent the spray heads serves to effect the removal of the kidneys and associated membrane from the body cavity of the fowl. This cleaning of the fowl renders it in full conformity with the requirements of the United States Department of Agriculture standards. Consequently, the fowl can be used for human consumption without any downgrading or loss to the operator.

FIGS. 5 through 9 illustrate a second embodiment of the invention which differs from the first embodiment in that there are no stationary spray heads 32. Instead, oscillating spray heads 132 having horizontally discharging nozzles 133 are supported for oscillation about the axis of the central vertical pipe 70. To achieve this result, spray heads 132 are mounted on the upper ends of vertical pipes 136 which extend downwardly and have their lower ends fastened in a manifold fitting 140 extending outwardly from the base sleeve 152 which is identical to base sleeve 52.

Manifold fitting 140 includes a conduit coupling which communicates with the vertical pipes 136 and receives water from a flexible hose 160 connected to a pipe 162 which is in turn connected to the output of the pump 88.

Additionally, the second embodiment differs from the first embodiment in that it employs a stationary fowl positioning and supporting rack 139 which is identical to the first fowl positioning and supporting rack 39 of the first embodiment with the exception of the fact that it is not connected to the base sleeve 152 and is consequently stationary. Specifically, the rack 139 includes vertical legs 172 resting on the table-like panel 24 as shown in FIG. 7. All of the remaining components are identical to the components of the first embodiment and the same reference numerals are consequently applied thereto.

In operation, the fowl is positioned over the rack 139 in the same manner as over the rack 39 of the first embodiment and pressurized water at approximately 125 pounds per square inch is ejected from the spray heads 132 and the rotary spray head 134. Motor 66 causes the spray heads 132 to oscillate about the axis of pipe 70 and spray head 34 is rotated about the axis of pipe 70, the water ejected from the nozzles on the spray heads is caused to forcefully engage the entire surface of the body cavity of the bird with a particularly forceful application occurring in the area of the body cavity adjacent the backbone in which the kidneys and their covering membrane are located. Consequently, all contamination and the kidneys and covering membrane are removed from the internal cavity so as to completely clean the bird so that it will pass the United States Department of Agriculture requirements.

It should be understood that numerous modifications of the invention will undoubtedly occur to those of skill in the art and the spirit and scope of the invention is to be limited solely by the appended claims.

I claim:

1. A method of removing contamination from the body cavity of a fowl comprising the steps of orienting the fowl in a substantially tail-downward vertical position, positioning the fowl on a support means holding the fowl in said position, directing water jets from a plurality of relatively movable nozzles positioned in the body cavity while moving at least one group of said nozzles with respect to the fowl and creating relative movement between another group of said nozzles and the fowl supporting means.

2. The method of claim 1 wherein said water is provided to said nozzles at a pressure of approximately 120 pounds per square inch.

3. The method of claim 1 wherein said relative movement between said another group of nozzles and said fowl positioning and supporting means is effected by the step of oscillating said fowl positioning and supporting means about a vertical oscillation axis.

4. The method of claim 3 wherein said water is provided to said nozzles at a pressure of approximately 120 pounds per square inch.

5. The method of claim 1 wherein said movement of said one group of nozzles is effected by rotation of said one group of nozzles about a vertical axis of rotation.

6. The method of claim 5 wherein said relative movement between said another group of nozzles and said fowl positioning and supporting means is effected by the step of oscillating said fowl positioning and supporting means about a vertical oscillation axis.

7. The method of claim 6 wherein said fowl positioning and supporting rack is oscillated about an oscillation axis that is coextensive with said vertical axis of rotation of said one group of nozzles.

8. The method of claim 1 wherein said movement of said another group of nozzle means with respect to said fowl positioning and supporting means is effected by the step of oscillating said another group of nozzle means about a vertical oscillation axis.

9. The method of claim 8 wherein said water is provided to said nozzles at a pressure of approximately 120 pounds per square inch.

10. The method of claim 8 wherein said movement of said one group of nozzles is effected by rotation of said one group of nozzles about a vertical axis of rotation.

11. The method of claim 10 wherein said another group of nozzles is oscillated about an oscillation axis that is coextensive with the vertical axis of rotation of said one group of nozzles.

* * * * *